US012492889B2

(12) United States Patent
Laman

(10) Patent No.: US 12,492,889 B2
(45) Date of Patent: Dec. 9, 2025

(54) CHROMATIC RANGE SENSOR SYSTEM INCLUDING CAMERA

(71) Applicant: Mitutoyo Corporation, Kanagawa-ken (JP)

(72) Inventor: Norman Laman, Kenmore, WA (US)

(73) Assignee: MITUTOYO CORPORATION, Kanagawa-Ken (JP)

( * ) Notice: Subject to any disclaimer, the term of this patent is extended or adjusted under 35 U.S.C. 154(b) by 1168 days.

(21) Appl. No.: 17/389,013

(22) Filed: Jul. 29, 2021

(65) Prior Publication Data

US 2023/0032656 A1 Feb. 2, 2023

(51) Int. Cl.
*G01B 11/02* (2006.01)
*G01B 11/06* (2006.01)
*G01S 7/481* (2006.01)

(52) U.S. Cl.
CPC ........ *G01B 11/026* (2013.01); *G01B 11/0608* (2013.01); *G01S 7/4818* (2013.01); *G01B 2210/50* (2013.01)

(58) Field of Classification Search
CPC .............. G01B 11/026; G01B 11/0608; G01B 2210/50; G01S 7/4818
USPC ...................................................... 356/4.01
See application file for complete search history.

(56) References Cited

U.S. PATENT DOCUMENTS

| | | |
|---|---|---|
| 6,441,910 B1 | 8/2002 | Christoph |
| 6,646,750 B1 | 11/2003 | Christoph |
| 7,322,704 B2* | 1/2008 | Shchegrov .............. H04N 9/315 |
| | | 372/99 |
| 7,324,682 B2 | 1/2008 | Wasserman |
| 7,454,053 B2 | 11/2008 | Bryll et al. |
| 7,477,401 B2 | 1/2009 | Marx et al. |
| 7,508,524 B2 | 3/2009 | Mahadevan-Jansen et al. |
| 7,626,705 B2 | 12/2009 | Altendorf |
| 7,876,456 B2 | 1/2011 | Sesko |
| 7,990,522 B2 | 8/2011 | Sesko |
| 8,085,295 B2 | 12/2011 | Tobiason et al. |

(Continued)

OTHER PUBLICATIONS

Trimos, "TR Scan Compact Z Mini Non-Contact Measuring Column." Printout of Web pages available as of Aug. 12, 2021, at https://www.trimos.com/optical-measurement/products/tr-scan-compact/tr-scan-compact-z, 3 pages.

(Continued)

*Primary Examiner* — Daniel L Murphy
(74) *Attorney, Agent, or Firm* — Seed Intellectual Property Law Group LLP

(57) ABSTRACT

A chromatic range sensor (CRS) system is configured to provide an in-focus image of a workpiece surface including a measurement spot usable as a guide light. The system includes an optical pen having a chromatically dispersive lens configuration providing axial chromatic dispersion, and a reflected light dividing configuration (e.g., a beamsplitter) arranged to receive and divide reflected light from the workpiece surface into a measurement portion and an imaging portion. The optical pen includes a narrowband spectral filter and a camera. The CRS system includes a processing portion configured to measure a distance from the optical pen to the workpiece surface, and to make an adjustment so that the distance corresponds to a focus distance at which the workpiece surface is in focus when imaged by the light that passes through the narrowband spectral filter.

24 Claims, 5 Drawing Sheets

(56) References Cited

U.S. PATENT DOCUMENTS

| | | | |
|---|---|---|---|
| 8,134,691 B2* | 3/2012 | Xie | G02B 27/20 |
| | | | 356/3.01 |
| 8,194,251 B2 | 6/2012 | Emtman et al. | |
| 8,212,997 B1 | 7/2012 | Xie | |
| 8,427,644 B2 | 4/2013 | Miki | |
| 8,477,320 B2 | 7/2013 | Stock et al. | |
| 8,488,895 B2 | 7/2013 | Muller et al. | |
| 8,587,772 B2 | 11/2013 | Sesko et al. | |
| 8,736,849 B2 | 5/2014 | Stroessner et al. | |
| 9,740,190 B2* | 8/2017 | Bryll | G02B 21/0016 |
| 9,808,147 B2 | 11/2017 | Kanamori | |
| 9,829,312 B2 | 11/2017 | Xie | |
| 9,881,400 B2* | 1/2018 | Zuiderweg | G01B 11/2441 |
| 9,958,266 B2* | 5/2018 | Patzwald | G01C 3/08 |
| 10,197,382 B2 | 2/2019 | Matsumiya et al. | |
| 10,260,941 B2* | 4/2019 | Marsaut | G01B 11/026 |
| 10,437,050 B2 | 10/2019 | Hirata | |
| 10,935,366 B2 | 3/2021 | Christoph et al. | |
| 11,359,966 B2* | 6/2022 | Moggridge | G01J 3/40 |
| 2005/0000102 A1 | 1/2005 | Christoph et al. | |
| 2005/0031191 A1 | 2/2005 | Venkatachalam | |
| 2005/0133378 A1 | 6/2005 | Glock et al. | |
| 2007/0141576 A1 | 6/2007 | Koide | |
| 2008/0097225 A1 | 4/2008 | Tearney et al. | |
| 2009/0153839 A1 | 6/2009 | Kay | |
| 2011/0043661 A1 | 2/2011 | Podoleanu | |
| 2012/0156636 A1 | 6/2012 | Stock et al. | |
| 2012/0314206 A1 | 12/2012 | Spizig et al. | |
| 2012/0327221 A1 | 12/2012 | Christoph et al. | |
| 2014/0043468 A1 | 2/2014 | Engel | |
| 2014/0043474 A1 | 2/2014 | Westphal et al. | |
| 2015/0055215 A1 | 2/2015 | Chen et al. | |
| 2015/0083829 A1 | 3/2015 | Werger | |
| 2016/0377995 A1 | 12/2016 | Fresquet et al. | |
| 2021/0132194 A1 | 5/2021 | Nagornykh | |

OTHER PUBLICATIONS

"Non-Stop CNC Vision Measuring System," in *Vision Measuring Systems*, Quick Vision Stream Series, Bulletin 1874, Mitutoyo America Corporation, United States, Nov. 2005, 16 pages.

* cited by examiner

CHROMATIC RANGE SENSOR SYSTEM INCLUDING CAMERA

BACKGROUND

Technical Field

The invention relates to precision measurement instruments, and more particularly to chromatic range sensors capable of providing an in-focus image of a workpiece surface to be measured including a measurement spot formed thereon, and their use.

Description of the Related Art

It is known to use chromatic confocal techniques in optical range sensors (e.g., including height, distance, etc., sensors). As described in U.S. Pat. No. 7,876,456, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer-type detector measures the signal level for each wavelength, in order to determine the surface height.

Certain manufacturers refer to practical and compact chromatic range sensing (CRS) systems that operate as described above, and that are suitable for use in an industrial setting, as chromatic point sensors (CPS) or chromatic line sensors, or the like. A compact chromatically-dispersive optical assembly used with such systems is referred to as an "optical pen," or a "pen." The optical pen is connected through an optical fiber to an electronics portion of the chromatic range sensor. The electronics portion includes a first light source that transmits light through the fiber to be output from the optical pen, and also provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" (e.g., as indicated by a peak or centroid of the intensity profile), and the resulting pixel coordinate (e.g., of the peak and/or centroid) is used with a lookup table to determine the distance to the surface.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Prior-art CRS systems lacked means by which a user can readily confirm whether a workpiece surface is properly positioned relative to the CRS system so that the CRS system will measure the correct point (i.e., a distance to the correct point) of the workpiece surface. Specifically, while the CRS lens arrangement works well for CRS measurement operations where different wavelengths are in focus at different distances, it is not well suited for imaging operations for the very reason. That is, the different wavelengths coming back to an imaging camera would be focused at different distances to thereby form a jumbled image, which is mostly blurry because only one of the different wavelengths would be in focus.

Various aspects of the present invention are directed to configuring a CRS system to be capable of providing an in-focus image of a workpiece surface including a measurement sport formed thereon. The CRS system allows a user to view the in-focus image of the measurement spot as a "guide light" in properly positioning the workpiece surface relative to an optical pen of the CRS system, giving the user a more direct assurance that the CRS system is measuring the correct point on the workpiece surface.

According to one aspect, a chromatic range sensor (CRS) system is provided, which is operable to provide an in-focus image of a workpiece surface to be measured, wherein the image includes a measurement spot formed on the workpiece surface. The CRS system includes: (a) an optical pen; (b) a first light source; (c) a CRS wavelength detector; and (d) a processing portion.

The optical pen includes a housing; an in/out optical fiber including a fiber aperture configured to output light along a measurement optical path and receive reflected light along the measurement optical path; and a chromatically dispersive lens configuration having an optical axis which defines a measurement axis of the chromatic confocal range sensor optical pen. The lens configuration is included in the measurement optical path and is configured to: receive light and output focused light to a workpiece surface with axial chromatic dispersion such that different wavelengths are focused at different distances proximate to the workpiece surface; and receive reflected light from the workpiece surface and focus at least a portion of the reflected light along the measurement optical path to a point proximate to the fiber aperture.

The optical pen further includes a reflected light dividing configuration arranged to receive the reflected light from the chromatically dispersive lens configuration, and divide the reflected light into a measurement portion and an imaging portion. The optical pen also includes a narrowband spectral filter arranged to filter at least part of the imaging portion of the reflected light; and a camera portion comprising an image detector, configured to receive at least part of the imaging portion of the reflected light passing through the narrowband spectral filter for producing a camera image.

The first light source is configured to generate multi-wavelength first light that is input to the optical pen.

The CRS wavelength detector includes a plurality of pixels with respective pixel positions distributed along a measurement axis of the CRS wavelength detector, configured to receive at least part of the measurement portion of the reflected light and to provide output spectral profile data.

The processing portion is configured to process the output spectral profile data to measure a distance from the optical pen to the workpiece surface, and to make an adjustment so that the distance from the optical pen to the workpiece surface corresponds to a focus distance at which the workpiece surface is in focus when imaged by the light that passes through the narrowband spectral filter, wherein the light that does not pass through the narrowband spectral filter comprises out-of-focus light.

According to one aspect, in the CRS system of claim 1, after the adjustment is made by the processing portion, a corresponding camera image includes a measurement spot on the in-focus workpiece surface, wherein the measurement spot is formed by part of the imaging portion of the reflected light that comprises first light from the first light source that is output from the fiber aperture and is reflected by the workpiece surface.

According to another aspect, the CRS system further includes a second light source that produces second light that is input to the chromatically dispersive lens configuration, wherein the imaging portion comprises reflected second light that is reflected from the workpiece surface. For example, the second light source may include a light emitting diode (LED). For example, a spectral bandwidth of the narrowband spectral filter falls within a spectral bandwidth of the second light source.

According to another aspect, the narrowband spectral filter has a spectral bandwidth of less than 10 nanometers.

According to another aspect, the narrowband spectral filter has a spectral bandwidth of less than 5 nanometers.

According to another aspect, a spectral bandwidth of the narrowband spectral filter is similar to a spectral bandwidth of the received reflected light that is coupled through the fiber aperture back into the in/out optical fiber, such that the bandwidth of the narrowband spectral filter is no more than twice the spectral bandwidth coupled back into the fiber.

According to another aspect, the narrowband spectral filter has a center wavelength which corresponds to a middle portion of a CRS measurement range of the CRS system.

According to another aspect, the CRS system further comprising a screen portion configured to display the camera image.

According to another aspect, the processing portion is operable in a plurality of modes including a measurement mode, in which the distance from the optical pen to the workpiece surface is measured based on the measurement portion of the reflected light, and a guide light mode, in which the camera image of the workpiece surface is produced based on the imaging portion of the reflected light and for which the camera image includes the measurement spot which is configured to be utilized as the guide light.

According to another aspect, the adjustment made by the processing portion comprises causing the distance from the optical pen to the workpiece surface to correspond to the focus distance. For example, the adjustment may comprise utilizing a motion controller for adjusting the distance from the optical pen to the workpiece surface. For example, the motion controller may be part of a machine vision inspection system, to which the optical pen is coupled.

According to another aspect, the reflected light dividing configuration comprises a beamsplitter.

According to another aspect, the ratio of the measurement portion to the imaging portion is at least 5 to 1.

According to another aspect, at least part of the measurement portion of the reflected light and at least part of the imaging portion of the reflected light propagate in parallel with each other.

According to another aspect, the measurement portion and the imaging portion of the reflected light extend along two different optical axes after being divided by the reflected light dividing configuration.

According to another aspect, a method is provided for operating a chromatic range sensor (CRS) system to provide an in-focus image of a workpiece surface to be measured including a measurement spot. The CRS system includes: (a) an optical pen; (b) a first light source configured to generate multi-wavelength first light that is input to the optical pen; and (c) a CRS wavelength detector.

The optical pen includes a housing; an in/out optical fiber including a fiber aperture configured to output light along a measurement optical path and receive reflected light along the measurement optical path; and a chromatically dispersive lens configuration having an optical axis which defines a measurement axis of the chromatic confocal range sensor optical pen. The lens configuration is included in the measurement optical path and is configured to: receive light and output focused light to a workpiece surface with axial chromatic dispersion such that different wavelengths are focused at different distances proximate to the workpiece surface; and receive reflected light from the workpiece surface and focus at least a portion of the reflected light along the measurement optical path to a point proximate to the fiber aperture.

The optical pen also includes a reflected light dividing configuration arranged to receive the reflected light from the chromatically dispersive lens configuration, and divide the reflected light into a measurement portion and an imaging portion. The optical pen further includes a narrowband spectral filter arranged to filter at least part of the imaging portion of the reflected light; and a camera portion comprising an image detector, configured to receive at least part of the imaging portion of the reflected light passing through the narrowband spectral filter for producing a camera image.

The CRS wavelength detector includes a plurality of pixels with respective pixel positions distributed along a measurement axis of the CRS wavelength detector, configured to receive at least part of the measurement portion of the reflected light and to provide output spectral profile data;

The method includes the following steps including:
  operating the CRS system to measure a distance from the optical pen to the workpiece surface based on the output spectral profile data;
  making an adjustment so that the distance from the optical pen to the workpiece surface corresponds to a focus distance at which the workpiece surface is in focus when imaged by the light that passes through the narrowband spectral filter; and
  displaying a camera image of the workpiece surface including a measurement spot.

According to another aspect, the method further includes the step of:
  illuminating the workpiece surface with second light that is input to the chromatically dispersive lens configuration, wherein the second light comprises wavelengths that fall within the spectral bandwidth of the narrowband spectral filter and the imaging portion comprises reflected second light that is utilized for imaging the workpiece surface. For example, the imaging portion may further comprise reflected first light for imaging a measurement spot, for which the camera image includes an image of the workpiece surface and an image of the measurement spot on the workpiece surface.

According to one aspect, the narrowband spectral filter has a center wavelength corresponding to a middle portion of a CRS measurement range of the CRS system.

According to one aspect, the method further includes the steps of:

coupling the CRS system to a machine vision inspection system that includes a motion mechanism; and operating the CRS system as part of the machine vision inspection system, wherein the adjustment that is made comprises utilizing the motion mechanism of the machine vision system to cause the distance from the optical pen to the workpiece surface to correspond to the focus distance at which the workpiece surface is in focus when imaged by the light that passes through the narrowband spectral filter.

According to another aspect, a chromatic range sensor (CRS) system is provided, which is operable to provide an in-focus image of a workpiece surface to be measured, wherein the image includes a measurement spot formed on the workpiece surface. The CRS system includes (a) an optical pen; (b) a first light source; (c) a CRS wavelength detector; (d) one or more processors; and (e) memory.

The optical pen includes a housing; an in/out optical fiber including a fiber aperture configured to output light along a measurement optical path and receive reflected light along the measurement optical path; and a chromatically dispersive lens configuration having an optical axis which defines a measurement axis of the chromatic confocal range sensor optical pen. The lens configuration is included in the measurement optical path and is configured to: receive light and output focused light to a workpiece surface with axial chromatic dispersion such that different wavelengths are focused at different distances proximate to the workpiece surface; and receive reflected light from the workpiece surface and focus at least a portion of the reflected light along the measurement optical path to a point proximate to the fiber aperture.

The optical pen further includes a reflected light dividing configuration arranged to receive the reflected light from the chromatically dispersive lens configuration, and divide the reflected light into a measurement portion and an imaging portion. The optical pen also includes a narrowband spectral filter arranged to filter at least part of the imaging portion of the reflected light; and a camera portion comprising an image detector, configured to receive at least part of the imaging portion of the reflected light passing through the narrowband spectral filter for producing a camera image.

The first light source is configured to generate multi-wavelength first light that is input to the optical pen.

The CRS wavelength detector includes a plurality of pixels with respective pixel positions distributed along a measurement axis of the CRS wavelength detector, configured to receive at least part of the measurement portion of the reflected light and to provide output spectral profile data.

The memory is coupled to the one or more processors and stores program instructions that when executed by the one or more processors cause the one or more processors to at least:

operate the CRS system to measure a distance from the optical pen to the workpiece surface based on the output spectral profile data;

make an adjustment so that the distance from the optical pen to the workpiece surface corresponds to a focus distance at which the workpiece surface is in focus when imaged by the light that passes through the narrowband spectral filter; and display a camera image of the workpiece surface including a measurement spot.

According to various embodiments of the present invention, an imaging capability is integrated with a measurement capability of the CRS system to support guide light imaging of a measurement spot on a workpiece surface, which is natural and robust (simple registration and alignment) to improve measurement operations using the CRS system.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
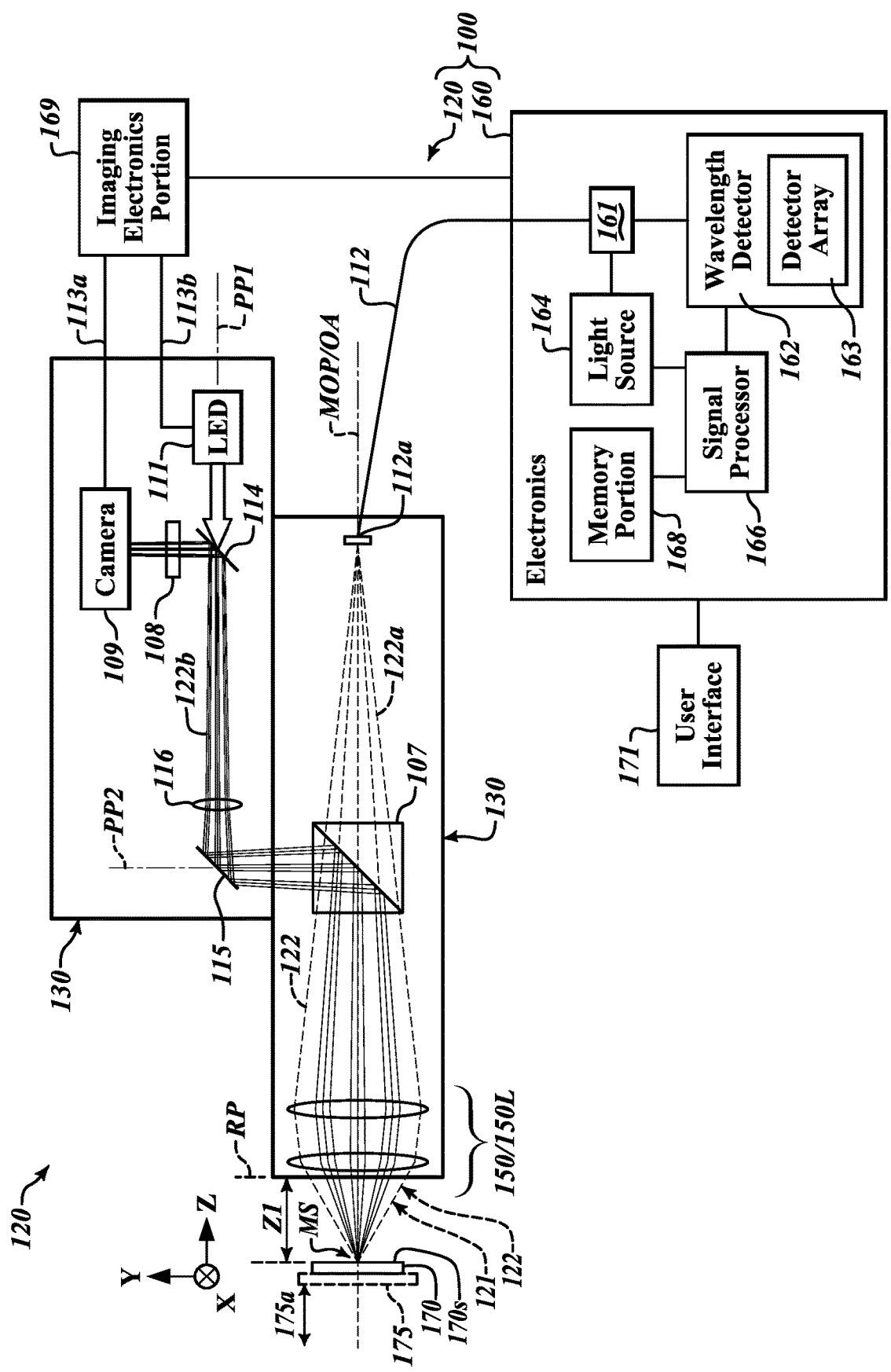
FIG. 1 is a block diagram of one embodiment of an exemplary CRS system.

FIG. 1 is a block diagram of one exemplary embodiment of a chromatic range sensor (CRS) system 100, including an optical pen 120, an electronics portion 160, and a user interface portion 171. The embodiment of the electronics portion 160 includes a signal processor 166, a memory portion 168, and a source and detector subsystem 161 comprising a wavelength detector 162 and a broadband first light source 164. The CRS system 100 shown in FIG. 1 is a chromatic point sensor (CPS) system which measures a single measurement point at a time, although it will be appreciated that in other implementations other sensor systems (e.g., a chromatic line sensor, etc.) may be utilized. In various embodiments, the wavelength detector 162 includes a detector array 163 of a spectrometer. The detector array 163 may comprise a plurality of pixels distributed along a measurement axis of the wavelength detector 162, wherein the respective pixels receive respective wavelength signals and provide corresponding output spectral profile data.

The electronics portion 160 is coupled to the optical pen 120 through an optical path including an in/out optical fiber 112. The in/out optical fiber 112 includes a fiber aperture 112a through which to output first light along a measurement optical path MOP, which coincides with an optical axis OA of the optical pen 120, and through which to receive reflected light along the measurement optical path MOP/optical axis OA. The first light source 164, which is controlled by the signal processor 166, is connected to input multi-wavelength light to the optical pen 120 through the in/out optical fiber 112.

The optical pen 120 includes a housing 130, the in/out optical fiber 112, an optics portion 150, a reflected light dividing configuration 107, a narrowband spectral filter 108, and a camera portion 109. The optics portion 150 comprises a chromatically dispersive lens configuration 150L having the optical axis OA which defines a measurement axis for the CRS optical pen 120. The lens configuration 150L is configured to receive light and output focused light 121 to a workpiece surface 170s of a workpiece 170 with axial chromatic dispersion such that different wavelengths are focused at different distances proximate to the workpiece surface 170s. The lens configuration 150L is configured to receive reflected light 122 from the workpiece surface 170s and focus at least a portion of the reflected light along the measurement optical path MOP to a point proximate to the fiber aperture 112a.

FIG. 1 includes orthogonal XYZ coordinate axes, as a frame of reference. The Z direction is defined to be parallel to the optical axis OA of the optical pen 120, which is the measurement optical path MOP in the illustrated example. In various embodiments, the CRS system 100 is capable of automatically making an adjustment so that a distance from the optical pen 120 to the workpiece surface 170s corresponds to a focus distance at which the workpiece surface is in focus when imaged by the camera portion 109, as will be described in more detail below. In one example implementation, the adjustment may be made by placing the workpiece 170 on a translation stage 175 including an adjustment mechanism 175a, such as a controllable motor that drives an actuator along guide bearings, capable of translating the translation stage 175 along the Z axis (which coincides with the optical axis OA). As will be additionally illustrated in FIG. 4, a workpiece 170' (i.e., analogous to the workpiece 170) may be mounted on a translation stage 472 of a machine vision inspection system used with a CRS system 100', and a suitable motion mechanism may be provided to move the optical pen 120 along the Z axis direction as part of the adjustment such that the workpiece surface 170s' (i.e., analogous to the workpiece surface 170s) will be at a height (a distance from the optical pen 120) where the workpiece surface is in focus when imaged by the camera portion.

The reflected light dividing configuration 107 is arranged to receive the reflected light 122 from the chromatically dispersive lens configuration 150L, and to divide the reflected light 122 into a measurement portion 122a and an imaging portion 122b. In various embodiments, the reflected light dividing configuration 107 is a beamsplitter. Generally, the reflected light dividing configuration 107 divides some of the reflected light 122 from the workpiece surface 170s as the imaging portion 122b to be used as imaging light, while the remaining light constitutes the measurement portion 122a to be used as distance measurement light. The reflected light dividing configuration 107 directs the imaging portion 122b of the reflected light 122 to the narrowband spectral filter 108 and the camera portion 109, and directs the measurement portion 122a of the reflected light 122 toward the fiber aperture 112a. In various implementations, the ratio of the measurement portion 122a to the imaging portion 122b of the reflected light is at least 5 to 1, and may be 9 to 1, for example. When the ratio is 9 to 1, a 90/10 beamsplitter may be used to form the reflected light dividing configuration 107 so that the measurement portion 122a comprises approximately 90% of the reflected light 122 and the imaging portion 122b comprises approximately 10% of the reflected light 122.

The narrowband spectral filter 108 (interchangeably called an optical bandpass filter or a narrow bandpass filter) is arranged to filter the imaging portion 122b of the reflected light, so as to pass through only a defined narrowband of the imaging portion 122b of the reflected light to the camera portion 109. In accordance with various exemplary embodiments, a spectral bandwidth of the narrowband spectral filter 108 is defined/selected for optimal imaging of a workpiece surface 170s including a measurement spot MS, which can be used as a guide light to assist an operator in properly positioning the workpiece surface relative to the CRS system 100. As is known in the art, in various implementations a spectral bandwidth may correspond/be defined in accordance with a full width-half maximum (FWHM) determination (e.g., the spectral bandwidth of a narrowband spectral filter may correspond/be defined in accordance with a FWHM determination for the narrowband spectral filter). In various embodiments, the spectral bandwidth of the narrowband spectral filter 108 may be less than 10 nanometers, or less than 5 nanometers (e.g., such as with a spectral bandwidth of approximately 2 nanometers).

In general, the narrow bandwidth of wavelengths that pass through the filter, even with the axial chromatic dispersion caused by the lens configuration 150L, may still mostly be in focus together when imaged by the camera 109. In contrast, the wavelengths that do not fall within the spectral bandwidth of the narrowband spectral filter 108 (e.g., and which may thus be primarily blocked/filtered by the narrowband spectral filter 108) may correspond to light that is/would otherwise be out-of-focus when/if imaged by the camera (e.g., for imaging the workpiece surface 170s). More specifically, in various implementations, the spectral bandwidth of the narrowband spectral filter may be determined/selected/utilized to block/filter out the out-of-focus light (e.g., when the distance from the optical pen to the workpiece surface corresponds to a focus distance at which the workpiece surface is in focus when imaged by the light that passes through the narrowband spectral filter).

As will be described in more detail below, in various implementations the measurement spot MS may be formed by part of the imaging portion 122b of the reflected light that comprises first light from the first light source 164 that is output from the fiber aperture 112a and is reflected by the workpiece surface 170s. In various implementations, it may be desirable for the spectral bandwidth of the narrowband spectral filter 108 to be such that the measurement spot MS as formed in the camera image will remain relatively small (e.g., as imaged by the wavelengths that fall within the spectral bandwidth and thus pass through the narrowband spectral filter 108). For example, a relatively small measurement spot MS (e.g., as utilized for a guide light) may assist a user in determining a precise location on a workpiece surface 170s that is being measured by the optical pen 120 (e.g., as opposed to a larger measurement spot MS which may provide a less precise indication of a location on the workpiece surface that is being measured). In some instances (e.g., for some diffuse workpieces, as opposed to some highly reflective workpieces) and for some configurations of imaging numerical apertures, such considerations may be a dominant factor for choosing a spectral bandwidth of a narrowband spectral filter 108 to be utilized. In some such instances, it may be desirable to choose a narrowband spectral filter 108 with a spectral bandwidth that is similar (e.g., approximately the same) as the spectral bandwidth of the received reflected light that is coupled through the fiber aperture 112a back into the in/out optical fiber 112 for measurements (e.g., such that the bandwidth of the narrowband spectral filter is no more than twice the spectral bandwidth coupled back into the fiber). As some examples, if an optical pen is utilized for which the received reflected light that is coupled through the fiber aperture 112a back into the in/out optical fiber 112 for measurements has a spectral bandwidth of approximately 3 nanometers, or 1 nanometer, a narrowband spectral filter 108 may be chosen/utilized that has an approximately similar/matching spectral bandwidth, such as 3 nanometers, or 2 nanometers, or 1 nanometer.

By making an adjustment so that the optical pen 120 of the CRS system 100 is at a distance from the workpiece surface 170s where the light corresponding to the spectral bandwidth of the narrowband spectral filter 108 is in focus, a relatively in-focus image of the workpiece surface including the measurement spot MS can be obtained. In various implementations, as an alternative to mechanically adjusting a distance between the optical pen 120 and workpiece surface 170s, the adjustment may be made optically by changing the focus characteristics of the chromatically dispersive lens configuration 150L so that the workpiece surface 170s, though remaining at the same physical distance from the optical pen 120, comes into focus when imaged by the light that falls within the spectral bandwidth that passes through the narrowband spectral filter 108. Further alternatively, the adjustment may be made by changing the internal filter wavelengths of the narrowband spectral filter 108 to match the wavelength(s) that are in focus at the current position of the workpiece surface 170s along the Z axis.

According to various embodiments, an image of the workpiece surface to be measured is captured in the middle of a CRS measurement range of the CRS system, for the system's robustness. In other words, the narrowband spectral filter 108 may have a center wavelength that approximately corresponds to a middle of the CRS measurement range of the CRS system. In various exemplary embodiments, the center wavelength may fall within a range approximately from 495 nm to 570 nm (e.g., in some instances corresponding to a color green), which is approximately in a middle of an example CRS measurement range which in some implementations may span between color blue (e.g., in focus when the workpiece is closer to the optical pen 120) and color red (e.g., in focus when the workpiece is farther from the optical pen 120). Use of the narrowband configuration as disclosed herein as utilizing light within the normal CRS measurement range (e.g., near or at the middle of the CRS measurement range) makes the guide light imaging of a measurement spot more natural and robust (e.g., with simple registration and alignment).

Figure 3:
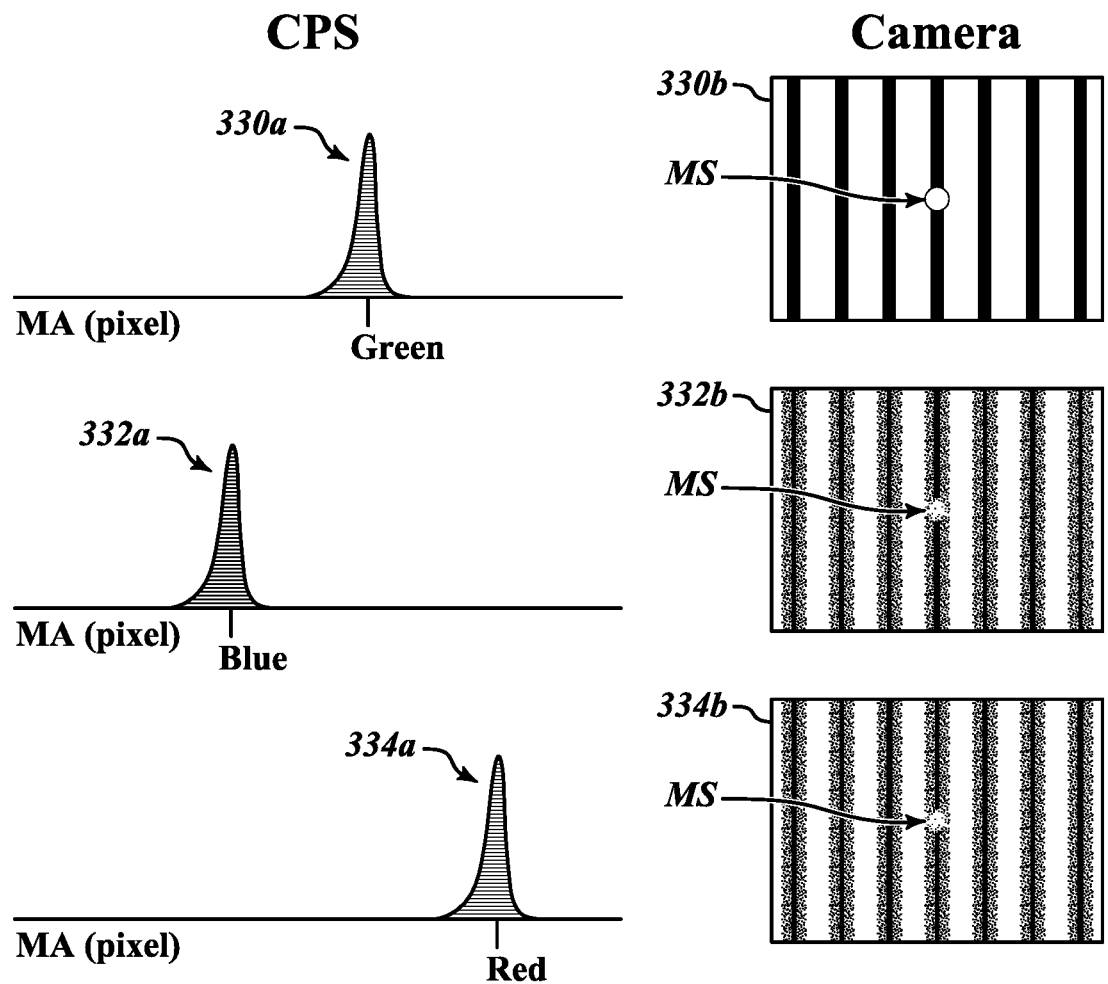
FIG. 3 illustrates three peak spectral profiles resulting from a workpiece surface respectively positioned for the green light focus, for the blue light focus, and for the red light focus, and the three images including a measurement spot MS on the workpiece surface taken at the respective positions.

The camera portion 109 comprises an image detector and is configured to receive the imaging portion 122b of the reflected light passing through the narrowband spectral filter 108, to thereby generate a camera image of the workpiece surface 170s including a measurement spot MS of the optical pen 120 formed on the workpiece surface 170s. The image of the workpiece surface 170s including the measurement spot MS may be displayed on a screen or the like included in the user interface portion 171, such as an image as shown in FIG. 3 (e.g., see 330b) to be described in more detail below.

In the example illustrated in FIG. 1, a second light source 111, such as a light emitting diode (LED), a second beamsplitter 114, such as a 50/50 beamsplitter, a reflector 115, and a lens 116 are provided to form the propagation path (e.g., as part of an imaging optical path) for the imaging portion 122b of the reflected light. As shown in the illustrated example, at least a portion of the measurement portion 122a and at least a portion of the imaging portion 122b propagate in parallel with each other, for compact arrangement inside the generally elongated housing 130 of the optical pen 120.

This is one example of a configuration related to the imaging portion 122b of the reflected light, and the disclosure is not limited to this particular example. For example, at least part of the propagation paths of the imaging portion 122b and the measurement portion 122a may be swapped, such as by placing the camera portion 109 along the illustrated optical axis OA of the optical pen 120 (e.g., where the fiber aperture 112a is located in the current example of FIG. 1), and by placing the fiber aperture 112a along a propagation path PP1, which is illustrated as the propagation path for the imaging portion 122b in the current example of FIG. 1. As another example, the reflector 115 may be omitted such that the imaging portion 122b would follow a propagation path PP2 that is generally perpendicular to the optical axis OA of the optical pen 120 toward the camera portion 109 that would then be located along the propagation path PP2. The particular propagation paths for the measurement portion 122a and the imaging portion 122b of the reflected light can be configured in various manners depending on each desired application and configuration of the optical pen 120. Generally, in various exemplary embodiments, the measurement portion 122a and the imaging portion 122b of the reflected light extend along two different optical axes after being divided by the reflected light dividing configuration 107.

The electronics portion 160 is coupled to, or includes, an imaging electronics portion 169. The imaging electronics portion 169 is configured to receive data from, and to provide control signals to, the camera portion 109 through a first signal line 113a. The data from the camera portion 109 may be displayed on a display (e.g., a monitor or the like) included in the user interface portion 171. The imaging electronics portion 169 transmits control data through a second signal line 113b to control operation of the second light source 111. Second light from the second light source 111 passes through the second beamsplitter 114, is focused through the lens 116, reflected by the reflector 115, and directed by the reflected light dividing configuration 107 through the chromatically dispersive lens configuration 150L of the optics portion 150 to illuminate the workpiece surface 170s. As described above, due to the normal operating characteristics of the chromatically dispersive lens configuration 150L, different wavelengths of the second light from the second light source 111 are focused at different distances proximate to the workpiece surface 170s. As a result, if all of the corresponding reflected second light was utilized for forming an image, such an image may otherwise appear out of focus, although as will be described in more detail below, the utilization of the narrowband spectral filter 108 enables an in-focus image of the workpiece to be produced. After the second light from the second light source 111 is reflected from the workpiece surface 170s as reflected second light, it may be included as at least part of the reflected light 122. More specifically, the reflected light 122, as well as the measurement portion 122a and the imaging portion 122b, may each comprise both reflected first light and reflected second light.

As described above, the reflected first light may arise from light from the first light source 164 as emitted from the in/out optical fiber 112 through the fiber aperture 112a and as reflected from the workpiece surface 170s. Corresponding reflected first light included in the corresponding measurement portion 122a may be received back through the fiber aperture 112a and used for measurement functions. Corresponding reflected first light included in the corresponding imaging portion 122b may be filtered by the narrowband spectral filter 108 and received by the camera 109 (e.g., for forming the measurement spot MS in an image, for which the spot may be compared to imaging a point source as corresponding to the first light emanating from the fiber aperture 112*a*).

In comparison, as noted above, the reflected second light may arise from light from the second light source 111. In various implementations, any corresponding reflected second light included in the corresponding measurement portion 122*a* may not be used for measurement functions (e.g., the second light source 111 may be turned off when measurement functions are being performed, such as when light is being provided for determining output spectral profile data based on the pixel data output from the detector array 163, so as to avoid measurement errors that may arise due to crosstalk between the light from the two light sources 111 and 164, and for which such measurement functions may not be performed when the second light source 111 is on). Thus, in various implementations, when measurement functions are being performed, the measurement portion 122*a* may include only reflected first light for which the first light originated from the first light source 164 as provided through the fiber aperture 112*a*.

Corresponding reflected second light included in the corresponding imaging portion 122*b* may be filtered by the narrowband spectral filter 108 and received by the camera 109 (e.g., for forming an image of the workpiece surface 170*s*, such as illustrated in FIG. 3). In contrast to the first light emanating from the fiber aperture 112*a*, the second light from the second light source 111 may illuminate a relatively larger area of the workpiece surface. Thus, as part of the imaging portion 122*b*, the reflected second light may be utilized for forming an image of the workpiece surface, while the reflected first light may be utilized for forming an image of the measurement spot MS on the workpiece surface. As described herein, for the forming of an image, the first light source 164 (e.g., for forming the measurement spot MS) may be on at the same time as the second light source 111, or may be on at a different time(s), but in some instances still within a single integration/frame time of the camera 109 for being included in an image (e.g., a single image). A resulting image includes both an illuminated portion of the workpiece surface (e.g., from the second light of the second light source 111) and a measurement spot MS (e.g., from the first light of the first light source 164), for which certain examples are described in more detail below with respect to FIG. 3. The result is an image of the workpiece surface 170*s* as including the measurement spot MS (e.g., used as a guide light), to thereby assist a user in properly positioning the workpiece surface 170*s* and/or CRS system 100 relative to one another for measuring a desired location on the workpiece surface 170*s*.

In some embodiments, the first light source 164 may be referenced as a measurement light source with the first light referenced as measurement light, for which the measurement portion of the reflected measurement light may be utilized for the measurement functions, while the imaging portion of the reflected measurement light may be utilized for imaging the measurement spot MS. The second light source 111 may be referenced as an imaging light source with the second light referenced as imaging light, for which the imaging portion of the reflected imaging light may be utilized for imaging the workpiece surface, in accordance with the operations as described above.

In various exemplary embodiments, a wavelength range of the second light source 111 is selected to include wavelengths that generally correspond to wavelengths of the spectral bandwidth that passes through the narrowband spectral filter 108 to form an image of the workpiece surface 170*s* including the measurement spot MS formed thereon. For example, when the narrowband spectral filter 108 is configured with a spectral bandwidth to pass through wavelengths with a center wavelength selected from a range between approximately 495 nm and 570 nm (e.g., in some instances corresponding to color green, such as the narrowband spectral filter 108 having a spectral bandwidth from 530 nm to 532 nm, with a center wavelength correspondingly at 531 nm), which is near the middle of the CRS measurement range of the CRS system 100 as described above, a green LED may be used as the second light source 111 to provide light for illuminating the workpiece surface 170*s*.

In various embodiments, the second light source 111 may emit light having a spectral bandwidth (e.g., a wavelength range) that is at least two, five or ten times the spectral bandwidth of the narrowband spectral filter 108. For example, if the narrowband spectral filter 108 has a spectral bandwidth of 2 nm (e.g. from 530 nm to 532 nm, with a center wavelength correspondingly at 531 nm), the second light source 111 may have a spectral bandwidth of at least 4 nm, 10 nm or 20 nm (e.g., at least from 520 nm to 540 nm), such as with the spectral bandwidth and/or center wavelength of the narrowband spectral filter 108 near the middle of the spectral bandwidth of the second light source 111. Such configurations may be advantageous in implementations where the wavelength range of the second light source 111 may drift (e.g., due to temperature, etc.), for which a wider spectral bandwidth of the second light source 111 helps ensure that the emitted light will still include wavelengths that fall within the spectral bandwidth of the narrowband spectral filter 108, even if drift is occurring. In various implementations, it may also be desirable for the second light source 111 to be an incoherent light source (e.g., to avoid effects such as speckle, etc.), for which such incoherent light sources may in some instances naturally have a relatively larger spectral bandwidth (e.g., as compared to certain comparable coherent light sources, etc.) As another consideration, it may be desirable for the spectral bandwidth of the second light source 111 to be somewhat limited (e.g., to reduce energy consumption, etc.) For example, in some implementations the spectral bandwidth of the second light source 111 may be less than 100 nm, or less than 50 nm.

In various embodiments, the second light source 111 may be turned off during at least certain portions of the measurement operation (as opposed to the imaging operation) in which the CRS system 100 is used to measure a distance to the workpiece surface 170*s*, so as to avoid measurement errors that may arise due to crosstalk between the light from the two light sources 111 and 164. In implementations where there is some non-measurement time in the measurement operation due to the CRS electronics, the second light source 111 may in some embodiments be turned on during the non-measurement time, for one or multiple times during a single camera frame of the camera portion 109 for example, so as to provide illumination for the imaging operation without interfering with the distance measurement operation of the CRS system 100 in each frame.

In various embodiments, the first light provided by the first light source 164 may be turned on during at least part of the imaging operation, in that the first light from the first light source 164 may be utilized to form the measurement spot MS in the image to be used as a guide light. Thus, one approach is to have the first light source 164 "on" during both CRS measurement operations and imaging operations, while having the second light source 111 "on" only during the imaging operations and "off" during the CRS measurement operations.

For a measurement operation (e.g., for a distance measurement to the workpiece surface 170s), the optical pen 120 is connected to the CRS electronics portion 160 and operably positioned relative to the workpiece surface 170s. Light emitted from the in/out optical fiber 112 through the fiber aperture 112a is focused by the optics portion 150, which comprises the lens configuration 150L that provides axial chromatic dispersion such that different wavelengths are focused at different positions along the optical axis OA, as is known for CRS systems. The input light is focused proximate to the workpiece surface 170s, and light reflected from the workpiece surface 170s is refocused by the optics portion 150 onto the fiber aperture 112a (i.e., the measurement portion 122a of the reflected light is directed onto the fiber aperture 112a). For the measurement portion 122a, due to its axial chromatic dispersion, only one wavelength will have the focus distance that matches the measurement distance "Z1", which is the distance from a reference position RP that is fixed relative to the optical pen 120 to the location (e.g. height along the Z axis) of the workpiece surface 170s. The wavelength that is best focused on the workpiece surface 170s is the best focused wavelength at the fiber aperture 112a. Thus, predominantly the best focused wavelength passes through the fiber aperture 112a and into the core of the in/out optical fiber 112. The in/out optical fiber 112 routes the signal light to the wavelength detector 162 that is utilized to provide output spectral profile data for determining the wavelength having the dominant intensity, which corresponds to the measurement distance Z1 to the location of the workpiece surface 170s.

The wavelength detector 162 receives, from the detector array 163, the wavelength-dependent light intensity as an output spectral intensity profile distributed over an array of pixels (the pixel data) along a measurement axis of the detector array 163. The wavelength detector 162 operates to provide corresponding output spectral profile data based on the pixel data output from the detector array 163 (e.g., as will be described in more detail below with respect to FIG. 2).

Figure 2:
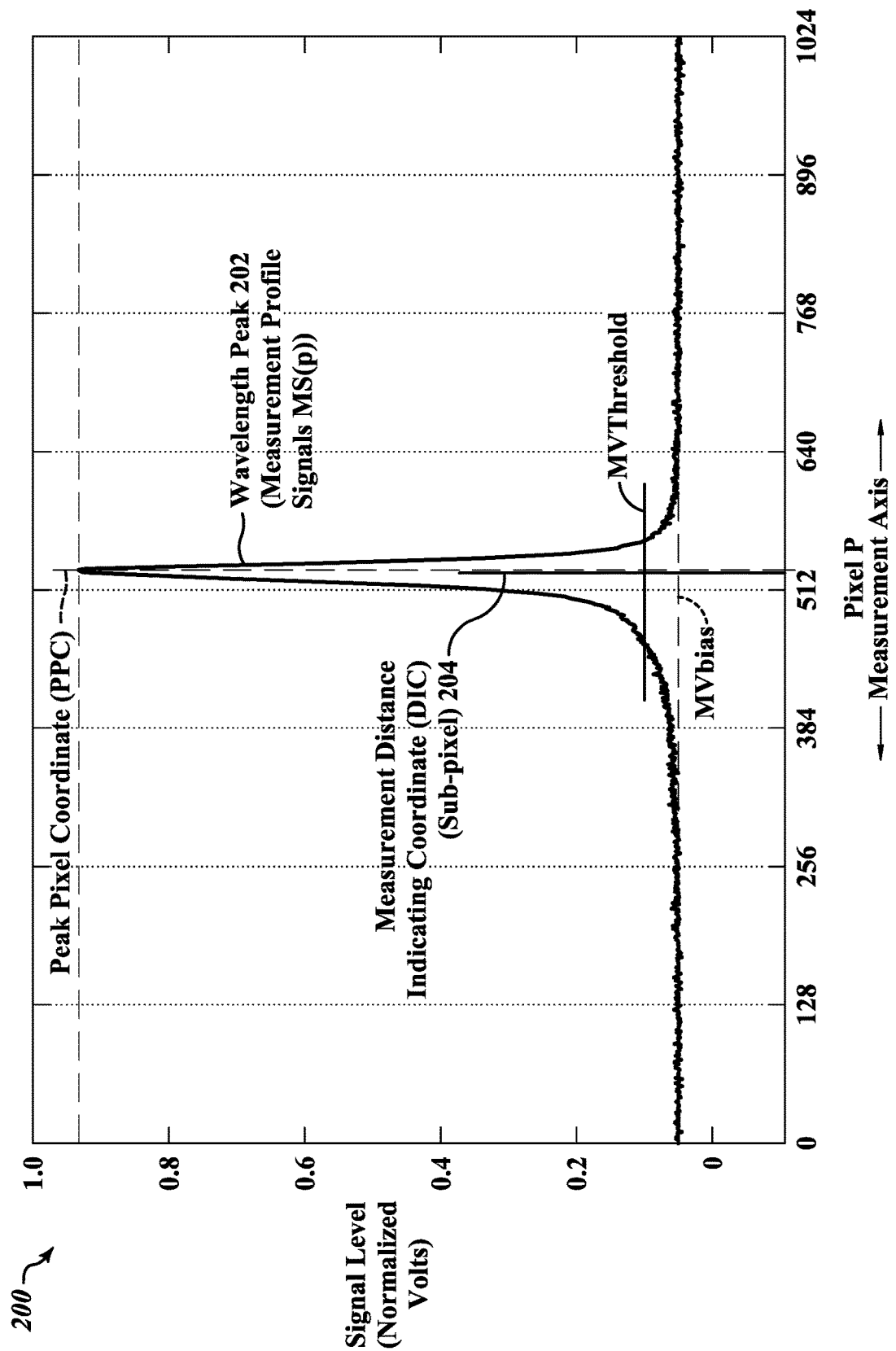
FIG. 2 is a diagram of an intensity profile from a CRS system illustrating a wavelength peak produced by a wavelength reflected by a workpiece surface to be measured, wherein a pixel position of the peak corresponds to a measurement distance to the workpiece surface.

FIG. 2 is a diagram 200 of a wavelength-dispersed intensity profile from the CRS system 100 illustrating a valid wavelength peak 202 produced by a subset of measurement profile signals MS(p) indicative of a wavelength focused on and reflected by the workpiece surface 170s. FIG. 2 shows a system noise (bias) signal level MVbias for the pixels in the detector array 163 when no measurement surface is present within the total measurement range of the CRS system 100. A signal level threshold MVThreshold is set to isolate the wavelength peak 202 (measurement profile signals MS) having a peak pixel coordinate (PPC), which is the pixel that has the highest signal. All "V" values are in normalized volts for each of 1,024 pixels along the "wavelength" measurement axis. "Normalized volts" assign a value of 1.0 to the saturation voltage of the detector array 163. In the illustrated embodiment, the signal level threshold MVThreshold defines the lower limit of a distance-indicating subset of measurement profile signals MS(p) forming the wavelength peak 202. Each of the measurement profile signals MS(p) has the signal level associated with each pixel p of the detector array 163. In accordance with previously known methods, subpixel-resolution distance-indicating coordinate (DIC) 204 of the profile data may be calculated by the signal processor 166, where the DIC (in subpixels) indicates the measurement distance Z1 (in microns) to the location of the workpiece surface 170s including the measurement spot MS formed thereon, via a distance calibration lookup table or the like, which is stored in a calibration portion of the memory portion 168. In various embodiments, the DIC 204 may be determined, with sub-pixel resolution, based on the distance-indicating subset of measurement profile signals MS(p) forming the wavelength peak 202 that has a value greater than MVThreshold (e.g., in accordance with centroid or other calculation/processing of the intensity profile data included in the wavelength peak 202).

FIG. 3 illustrates three peak spectral profiles 330a-334a resulting from the workpiece surface 170s respectively positioned for the green light focus, for the blue light focus, and for the red light focus, and the corresponding three images 330b-334b of the workpiece surface including the measurement spot MS formed thereon. The measurement axis (MA) indicated as corresponding to pixel numbers for each peak spectral profile may be regarded as being similar to the measurement axis with the corresponding pixel numbers in FIG. 2. As illustrated in FIG. 3, a green peak 330a represents a peak that is measured when the workpiece surface 170s is positioned (distanced from the reference position RP of the optical pen 120) where a wavelength corresponding to green light is the best focused light in the wavelength-dispersed (chromatically dispersed) intensity profile of the workpiece surface 170s. A blue peak 332a represents a peak that is measured when the workpiece surface 170s is positioned where a wavelength corresponding to blue light is the best focused light in the wavelength-dispersed intensity profile of the workpiece surface 170s. A red peak 334a is a peak that is measured when the workpiece surface 170s is positioned where a wavelength corresponding to red light is the best focused light in the wavelength-dispersed intensity profile of the workpiece surface 170s.

Different positions of the green peak 330a, the blue peak 332a, and the red peak 334a along the measurement axis MA (in pixels) indicate that different wavelengths of dominant intensity correspond to different measurement distances from the reference position RP of the optical pen 120 to the workpiece surface 170s. In typical embodiments, the workpiece surface 170s producing the blue peak 332a is positioned closest to the optical pen 120, then the workpiece surface 170s producing the green peak 330a, and finally the workpiece surface 170s producing the red peak 334a is positioned farthest from the optical pen 120.

Since the narrowband spectral filter 108 is configured to pass through only a defined narrowband of the imaging portion 122b of the reflected light 122 to the camera portion 109, it is desirable for workpiece surface 170s to be at a focus distance at which the workpiece surface 170s is in focus when imaged by the light that falls within the defined narrowband. This allows the camera portion 109 to capture an in-focus image of the workpiece surface 170s including the measurement spot MS. For example, when the narrowband spectral filter 108 is configured to pass through a narrow band of certain green wavelengths, the certain green wavelengths will pass through the narrowband spectral filter 108 but wavelengths corresponding to blue light and red light may be primarily blocked. Thus, when the workpiece surface 170s is positioned at the green light focus distance so as to generate the green peak 330a of FIG. 3, the focused (dominant) green light may pass through the narrowband spectral filter 108 to generate an in-focus green image 330b of the workpiece surface. In the example of FIG. 3, the in-focus green image 330b includes sharp dark and light vertical lines on the workpiece surface and a similarly sharp measurement spot MS.

On the other hand, when the workpiece surface 170s is positioned at the blue light focus distance (closer to the optical pen 120) or at the red light focus distance (father from the optical pen 120), the focused blue light or the focused red light reflected off of the workpiece surface 170s will primarily be blocked by the narrowband (e.g., green) spectral filter 108 and for which primarily only the out of focus green wavelengths will be allowed through to generate a blurred image 332b or 334b of the workpiece surface comprising blurred dark and light vertical lines and a blurred measurement spot MS. Note that the blurred images 332b and 334b are formed by green light (i.e., comprising out of focus green wavelengths), which has passed through the narrowband spectral filter 108 to reach the camera portion 109. Again, the images 332b and 334b are blurred because the focused blue or red light is blocked, and only the out-of-focus green light that passes through the narrowband spectral filter 108 is used to form the images 332b and 334b. As noted above, in this example implementation the second light provided by the second light source 111 may include wavelengths that are green (or otherwise as corresponding to the narrowband spectral filter 108), while the first light source 164 is a broadband light source (e.g., providing blue, green, red, etc. light) as part of normal CPS operations so that the distance Z to the workpiece surface 170s may be measured for any distance that is within the measurement range of the optical pen (e.g., as described in more detail in the incorporated references).

To ensure that an image of the workpiece surface 170s including the measurement spot MS will be well focused to serve as a guide light to assist a user to properly position the workpiece surface 170s relative to the CRS system 100, according to various exemplary embodiments, the CRS system 100 may be used to perform an adjustment (e.g., to perform an autofocus function to position the workpiece surface 170s at a focus distance), so that the workpiece surface 170s will be in focus when imaged by the narrowband light corresponding to the narrowband spectral filter 108.

In this regard, the CRS system 100 may be operable in a plurality of modes including a measurement mode, in which the distance from the optical pen 120 to the workpiece surface 170s is measured, and a guide light mode, in which the measurement spot MS may be used as a guide light to assist a user to properly position the workpiece surface 170s and/or optical pen 120 relative to one another (e.g., in X and Y axis directions) for the purpose of measurement operations and measuring specific desired surface points/locations on the workpiece surface. In the guide light mode, the distance to the workpiece surface 170s is measured and an adjustment is made (e.g., the distance is adjusted to correspond to a focus distance as corresponding to the narrowband spectral filter 108 as described above), and an in-focus image of the workpiece surface 170s including the measurement spot MS is taken by the camera portion 109 and displayed (e.g., on a display of the user interface portion 171). The user interface portion 171 may be configured to receive user input used for the operation of the CRS system 100 via any suitable means such as a keyboard, touch sensor, mouse, etc. For example, the user interface portion 171 may include one or more operation mode selecting elements (e.g., user-selectable buttons) operable by a user to select one of the plurality of operation modes of the CRS system 100.

In various embodiments, the user may select both the measurement mode and the guide light mode, in response to which the CRS system 100 may time-divisionally operate in the measurement mode and the guide light mode so that a user can perform measurement operations while intermittently using the guide light to ensure proper positioning of the workpiece surface 170s and/or optical pen 120 relative to one another (e.g., in X axis and Y axis directions) for the purpose of measurement operations. For example, when there is some non-measurement time in the measurement operation as described above, the imaging operation (in the guide light mode) may be performed during the non-measurement time, so as to provide the guide light imaging of the workpiece surface 170s including the measurement spot MS. In various embodiments, the user interface portion 171 may be configured to display information on a screen in connection with operation in any of the plurality of operation modes, such as an image of the workpiece surface 170s including the measurement spot MS during the imaging/guide light mode (see FIG. 3) or a distance to the workpiece surface 170s measured by the CRS system 100 during the measurement mode.

As will be described in more detail below with respect to FIG. 4, in some exemplary embodiments, the CRS system 100 may be coupled to or incorporated in a measuring machine, such as a machine vision inspection system (MVIS) (or a "vision system"). In particular, the measuring machine (e.g., vision system) may be used together with the CRS system 100 to perform an autofocus function to position the optical pen 120 and/or workpiece surface 170s relative to one another so that the workpiece surface is at a focus distance, at which the workpiece surface is in focus when imaged by the light that falls within the narrowband that passes through the narrowband spectral filter 108 as described above.

Figure 4:
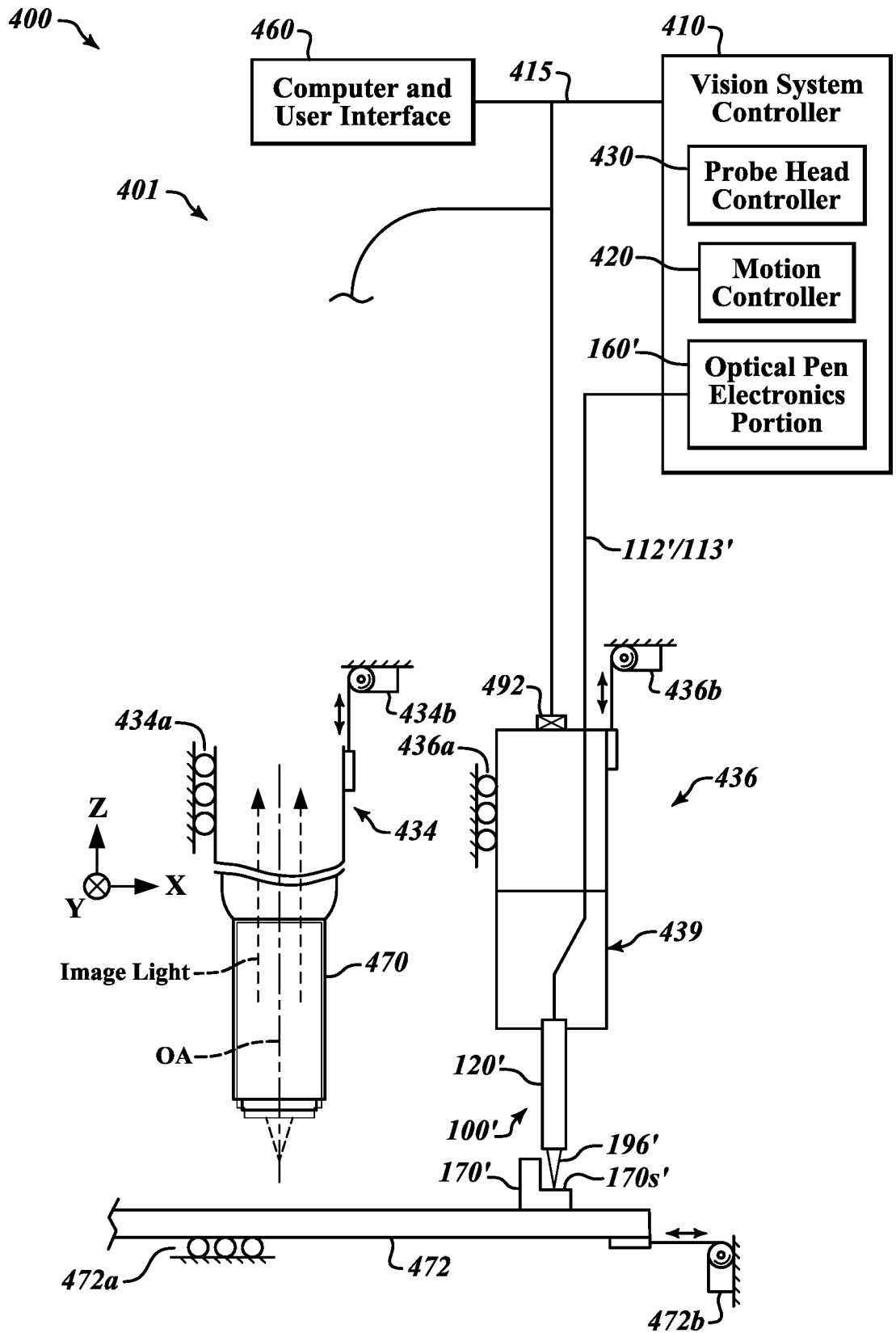
FIG. 4 is a diagram illustrating an exemplary embodiment of a machine vision inspection system comprising a CRS system used to provide an in-focus image of a workpiece surface to be measured including a measurement spot formed thereon.

FIG. 4 is a block diagram of a first exemplary implementation of a measuring system 400 including a measuring machine in the form of a machine vision inspection system (MVIS) 401, as utilized in conjunction with a CRS system 100' for measuring a workpiece. In various drawings herein, reference numbers having similar suffixes (e.g. reference number 1XX and 1XX') may refer to generally analogous elements, such that operation of element 1XX' may be generally understood by one of ordinary skill in the art with limited description, based on analogy to a previous description of analogous element 1XX.

As is known in the art, machine vision inspection systems ("vision systems") can be utilized to obtain precise dimensional measurements of inspected objects and to inspect various other object characteristics. Such systems may include a computer and user interface 460, a camera (not shown), an optical imaging system 434, and a precision stage 472 that is movable, such that the camera is enabled to scan the features of a workpiece that is being inspected. Machine vision inspection systems with optical systems such as the optical imaging system 434 are described in U.S. Pat. Nos. 7,454,053 and 8,085,295, which are hereby incorporated herein by reference in their entireties. Various aspects of machine vision inspection systems and control systems are also described in more detail in U.S. Pat. No. 7,324,682 (the '682 patent) and in U.S. Patent Pub. No. 20050031191 (the '191 publication), which are also hereby incorporated herein by reference in their entireties. As described in the '682 patent and the '191 publication, the machine vision inspection system (MVIS) 401 may include a vision system controller 410 which is usable to recall captured and stored workpiece inspection images, to inspect and analyze workpiece features in such workpiece inspection images, and to store and/or output the inspection results.

As illustrated in FIG. 4, the optical imaging system 434 including an objective lens 470 has an optical axis OA and may be utilized to magnify and image a surface of a workpiece on the stage 472. The optical imaging system 434 may attain an image focus by moving along Z axis guide bearings 434a, and in various implementations may be moved by a motion mechanism 434b (e.g., a controllable motor that drives an actuator to move the optical imaging system 434 along the Z axis). In various implementations, the motion mechanism 434b may be controlled by a motion controller 420 in the vision system controller 410. In various implementations, a workpiece may be located in the field of view (FOV) of the optical imaging system 434 on the workpiece stage 472, which is movable along X and Y axes on guide bearings 472a. The workpiece stage 472 may be moved by a motion mechanism 472b (e.g., a controllable motor that drives an actuator to move the workpiece stage 472 along the X and Y axes). In various implementations, the motion mechanism 472b may be controlled by the motion controller 420.

The machine vision inspection system (MVIS) 401 may include a probe system 436, which may be mounted to or otherwise coupled to a turret of the MVIS 401 (forming the optical imaging system 434) via suitable bracket means (not shown). The probe system 436 may be adapted to hold an optical pen 120' of the CRS system 100', to be used in conjunction with various measurement and imaging functions, such as those described above. The optical pen 120' will be understood to include similar or identical components as the optical pen 120 of FIG. 1 (e.g., including the standard optical pen components, as well as the narrowband spectral filter, camera, second light source, etc.) The optical pen 120' may be mechanically coupled to a probe head assembly 439, and a bus including an optical fiber 112' and signal line 113' (e.g., analogous to the optical fiber 112 and signal lines 113a and 113b) connects the optical pen 120' to the optical pen electronics portion 160' of the CRS system 100'. In the illustrated embodiment, the optical pen electronics portion 160' is part of the vision system controller 410, and may include an imaging electronics portion (e.g., analogous to imaging electronics portion 169 of FIG. 1). The MVIS 401 may include associated control software, approximately comparable to those available with the QUICK VISION® QV Apex series of vision systems available from Mitutoyo America Corporation (MAC), located in Aurora, IL.

In this configuration, standard coordinate measuring machine techniques may be utilized in conjunction with standard machine vision techniques to utilize the motion controller 420 to control the probe system 436 to automatically position the optical pen 120' with the measurement beam 196' in relation to a surface 170s' of a workpiece 170'. Additionally or alternatively, the machine vision control system 401 may be utilized to move the workpiece stage 472 and the workpiece 170' and/or the optical imaging system 434, so that measurement and imaging functions (e.g., such as those described herein and in the incorporated references, etc.) may be performed. In particular, the CRS system 100' may include all of the elements and capabilities described above (e.g., including with respect to FIGS. 1-3), including those for providing an in-focus image of the workpiece surface 170s' including a measurement spot MS (e.g., as formed by the measurement beam 196').

As illustrated in FIG. 4, the probe system 436 is movable along Z axis guide bearings 436a, and may be moved by the motion mechanism 436b (e.g., a controllable motor that drives an actuator to move the probe system 436 along the Z axis). In various implementations, the motion mechanism 436b may be controlled by the motion controller 420. In various implementations, the probe system 436 may be coupled to the optical imaging system 434 (e.g., coupled to a turret that contains the optical imaging system 434 via suitable bracket means), such that one or both of the Z axis guide bearings 434a and/or 436a may be included and/or otherwise utilized for enabling the Z axis motion of the optical imaging system 434 and the probe system 436 as controlled by one or both of the motion mechanisms 434b or 436b. In some implementations, the turret of the MVIS 401 and the optical pen 120' of the CRS system 100' move along the Z-axis direction in tandem. In various implementations, the Z measurement ranges of the optical imaging system 434 and the optical pen 120' may be calibrated or referenced to one another and to the MVIS 401's Z axis controller coordinates. The optical pen electronics portion 160' and the vision system controller 410 may be configured to exchange data and control signals according to known methods to support coordinated adjustment (e.g., mechanical movement) of the optical pen 120' and the optical imaging system 434.

FIG. 4 illustrates blocks representing exemplary control circuits and/or routines. The blocks include the computer and user interface 460, the vision system controller 410, which may act as a host system for communicating with the optical pen electronics portion 160' and which includes the motion controller 420 and a probe head controller 430. All of the blocks are interconnected to each other and to various components of the machine vision and inspection system 401 by a power and control bus 415, which is connected to the probe system 436 through a connection 492 in the embodiment in FIG. 4. The optical pen electronics portion 160' may perform measurements using the optical pen 120', and exchange control and data signals with the computer and user interface 460 and/or the vision system controller 410. The motion controller 420 of the MVIS 401 may be utilized for controlling a motion mechanism (e.g., motion mechanism 436b) for adjusting the distance between the optical pen 120' and the workpiece surface 170s', to correspond to a distance at which the workpiece surface 170s' is in focus when imaged by the second light that falls within the narrowband for passing through the narrowband spectral filter of the optical pen 120' (e.g., such that the surface 170s' of the workpiece 170' with the measurement spot MS will be in focus in the image). As noted above, in various implementations, the workpiece 170' may also be positioned in X and Y directions relative to the optical pen 120' (e.g., by movement of the workpiece stage 472, which is movable along X and Y axes on the guide bearings 472a as moved by the motion mechanism 472b as may be controlled by the motion controller 420).

As noted above, in various implementations a spectral bandwidth of a narrowband spectral filter as included in the optical pen 120' may be defined/selected for optimal imaging of the workpiece surface 170s' including a measurement spot MS, which can be used as a guide light to assist an operator in properly positioning the workpiece surface 170s' relative to the optical pen 120' of the CRS system 100' (e.g., as positioned in X and Y axis directions). In general, the narrow bandwidth of wavelengths that pass through the narrowband spectral filter, even with the axial chromatic dispersion caused by the lens configuration of the optical pen 120', may still mostly be in focus together when imaged by the camera of the optical pen 120'. In contrast, the wavelengths that do not fall within the spectral bandwidth of the narrowband spectral filter (e.g., and which may thus be primarily blocked/filtered by the narrowband spectral filter) may correspond to light that is/would otherwise be out-of-focus when/if imaged by the camera (e.g., for imaging the workpiece surface 170s'). More specifically, in various implementations the spectral bandwidth of the narrowband spectral filter may be determined/selected/utilized to block/filter out the out-of-focus light (e.g., when the distance from the optical pen 120' to the workpiece surface 170s' corresponds to a focus distance at which the workpiece surface 170s' is in focus when imaged by the light that passes through the narrowband spectral filter). As noted above, in various implementations the spectral bandwidth of the narrowband spectral filter may have a center wavelength that approximately corresponds to a middle of the CRS measurement range of the CRS system (e.g., for which the center wavelength falls within the middle 10 percent of the CRS measurement range). Use of the narrowband configuration as disclosed herein as utilizing light within the normal CRS measurement range (e.g., near or at the middle of the CRS measurement range) makes the guide light imaging of a measurement spot more natural and robust (e.g., with simple registration and alignment).

In one implementation in which an optical pen 120/120' of a chromatic range sensor system is utilized to scan along a path of measurement points over a workpiece surface, the process for capturing images (i.e., for illustrating where on the workpiece the measuring spot is) may be performed at different select positions along the measuring path. This may require separate positioning of the optical pen along the Z axis for each measurement point on the workpiece surface, for being at the right height for matching the distance at which the wavelength passing through the narrowband filter is in focus at each measurement point. For example, in one implementation, two images may be captured showing the measurement spot at the starting and ending points of the measurement path to confirm that the measurement spots are in the correct locations on the workpiece at the beginning and end of the measurement path. Some additional images may also be taken for various points along the measurement path, if desired. Such imaging may be done before or after the measurements are taken along the measurement path, including separately positioning the optical pen relative to the workpiece to image those surface points and capturing the images before or after the measurement process of measuring the surface points along the path. Alternatively, the imaging process may be performed as part of or during the process for measuring surface points along the path.

For capturing each in-focus image of a workpiece surface including a measurement spot MS, the Z position of the optical pen may need to be adjusted so that the measurement point on the workpiece is at the right Z distance from the optical pen to correspond to the distance that is in focus at a wavelength matching (i.e., passing through) the narrowband spectral filter. For example, after capturing a first image at the start of the path as described above, for taking the measurements at the points along the measurement path, the optical pen may be maintained at that same Z position (e.g., at the same Z position within the machine coordinate system or otherwise where the first image was in focus) while the position of the pen relative to the workpiece surface is moved in X and Y axis directions (e.g., by moving the stage 472 in FIG. 4). This approach may be effective if all the measurement points along the measurement path fall within the measurement range R of the optical pen as positioned at that Z height, for example, for a relatively flat workpiece, and for which the narrowband spectral filter 108 (e.g., green) may generally be in the middle of the range of the optical pen. In such cases, any measurement points varying slightly up and down from that Z height, as may happen for a relatively flat workpiece surface, may still be within the measurement range R of the optical pen at the Z position as movement is made in X and Y directions.

Alternatively, some measurement points along the path may be higher or lower than would fall within the measurement range R of the optical pen at the Z position, for which the Z position of the optical pen may need to be adjusted so that those measurement points will fall within the measurement range. Then, at the end of the measurement path, for whatever Z height the final/end measurement point is at, the process for capturing an in-focus image of the workpiece surface may be performed, including adjusting the Z distance (e.g., moving the optical pen along the Z axis) so that the final measurement point along the measurement path on the workpiece is at the right Z distance from the optical pen to correspond to the distance that is in focus at a wavelength matching the narrowband spectral filter 108.

For any surface point where the imaging process is performed, there may not need to be an additional measurement process performed for that surface point. More specifically, in various implementations, the imaging process itself (e.g., as described herein) may include performing a measurement process in order to determine how much to adjust the distance between the optical pen and the workpiece to bring the workpiece surface to an in-focus distance (e.g., relative to the narrowband spectral filter 108 and camera 109). More specifically, according to various implementations, an imaging process including an autofocus function according to the present disclosure may include: (1) determining a measurement of the initial distance between the optical pen and the surface point, and (2) adjusting the distance (e.g., by moving the optical pen in the Z direction) to an in-focus distance that corresponds to a wavelength of the narrowband spectral filter so that the image of the workpiece surface will be in focus. Thus, as part of the imaging process, step (1) may measure the initial distance to the workpiece surface point, and step (2) may determine the adjustment made to the initial distance in order to obtain the image in focus, and accordingly the current distance to the workpiece surface point (after the adjustment) is known or can otherwise be calculated based on the results from steps (1) and (2). Optionally, a step (3) may be performed to take another measurement of the current distance to the workpiece surface point (e.g., to confirm the accuracy of the movement mechanism of the measuring machine, such as the Z axis motion mechanism 436b of FIG. 4, etc.)

Figure 5:
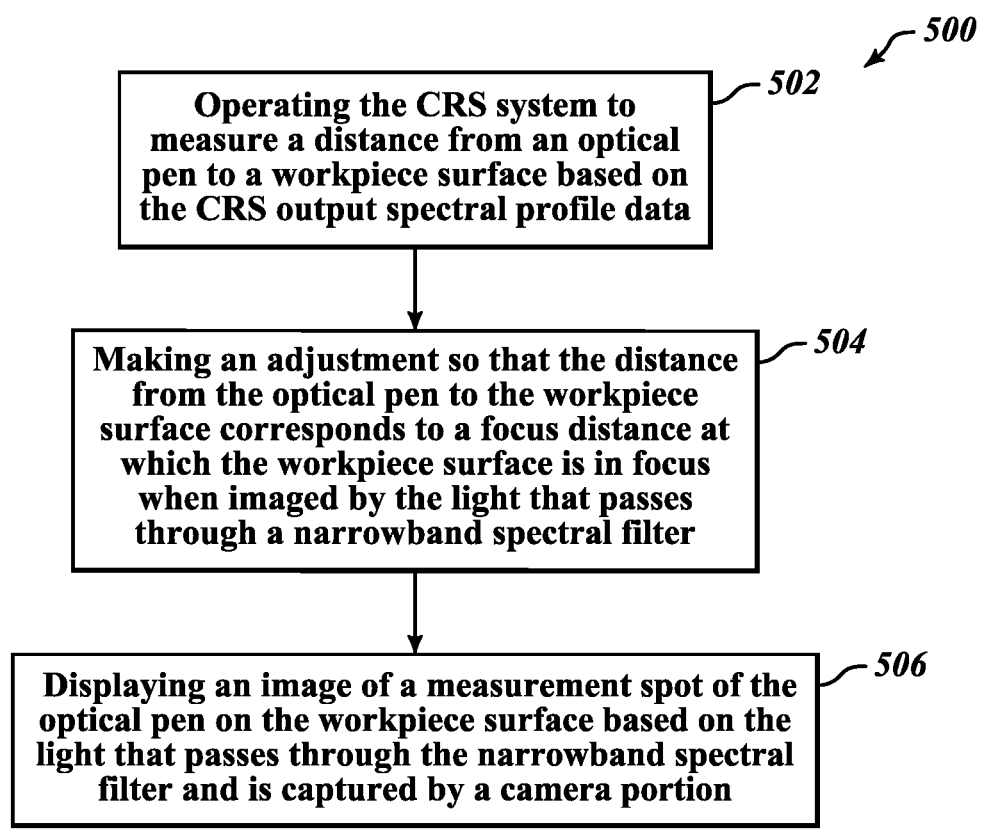
FIG. 5 is a flow diagram illustrating a method of operating a CRS system to provide an in-focus image of a workpiece surface to be measured including a measurement spot formed thereon.

FIG. 5 is a flow diagram illustrating a method 500 of operating a CRS system to provide an in-focus image of a workpiece surface including a measurement spot MS formed thereon. The CRS system is configured in accordance with embodiments described above. Step 502 includes operating the CRS system 100 to measure a distance from the optical pen 120 to the workpiece surface 170s based on the CRS output spectral profile data. Step 504 includes making an adjustment so that the distance from the optical pen 120 to the workpiece surface 170s corresponds to a focus distance at which the workpiece surface 170s is in focus when imaged by the light that falls within the narrowband that passes through the narrowband spectral filter 108. In various implementations, the adjustment may be made by changing the position of the workpiece surface 170s relative to the optical pen 120 along the Z axis, using the translation stage 175 and the adjustment mechanism 175a of the CRS system 100 as shown in FIG. 1, or the Z axis motion mechanism 436b and Z axis guide bearings 436a as shown in FIG. 4, etc.

The adjustment may also be made optically by changing the focus characteristics of the chromatically dispersive lens configuration 150L so that the workpiece surface 170s, though remaining at the same physical distance from the optical pen 120, comes into focus when imaged by the light that falls within the narrowband that passes through the narrowband spectral filter 108. Further alternatively, the adjustment may be made by changing the internal filter wavelengths of the narrowband spectral filter 108 to match the wavelength(s) that are in focus at the current position of the workpiece surface 170s along the Z axis.

Step 506 includes displaying an image of the measurement spot MS of the optical pen 120 on the workpiece surface 170s (i.e., the image of the workpiece surface 170s including the measurement spot MS formed thereon) based on the imaging portion 122b of the reflected light 122, including the light that passes through the narrowband spectral filter and that is captured by the camera portion 109. With the workpiece surface 170s in focus, in various implementations the displayed image can resolve workpiece features of 2 μm or greater around the measurement spot MS. In various implementations, the resolution of 2 μm is sufficient for the purpose of properly positioning the workpiece surface 170s relative to the CRS system 100. As noted above, in relation to such configurations, the spectral bandwidth of the narrowband spectral filter 108 may be defined/selected for optimal imaging of the workpiece surface 170s including the measurement spot MS, which can be used as the guide light to assist an operator in properly positioning the workpiece surface 170s relative to the CRS system 100 (e.g., as positioned in the X axis and Y axis directions).

In general, the various blocks outlined herein may be configured using components and operations that are similar or identical to those used for similar operations in the prior art. It will be appreciated that in various embodiments, the operations of the blocks outlined herein may be carried out using general purpose processors or the like, and that in various embodiments the circuits and/or routines associated with various blocks may be merged or indistinguishable.

While the preferred embodiments of the invention have been illustrated and described, numerous variations in the illustrated and described arrangements of features and sequences of operations will be apparent to one skilled in the art based on this disclosure. For example, a CRS system including a chromatic point sensor (optical pen) has been shown herein. However, a CRS system including a chromatic line sensor, may be configured to operate according to the systems and methods disclosed herein. It will be appreciated that these and various other alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A chromatic range sensor (CRS) system operable to provide an in-focus image of a workpiece surface to be measured, the image including a measurement spot formed on the workpiece surface, the CRS system comprising:
(a) an optical pen including:
a housing;
an in/out optical fiber including a fiber aperture configured to output light along a measurement optical path and receive reflected light along the measurement optical path;
a chromatically dispersive lens configuration having an optical axis which defines a measurement axis of the chromatic confocal range sensor optical pen, wherein the lens configuration is included in the measurement optical path and is configured to:
receive light and output focused light to a workpiece surface with axial chromatic dispersion such that different wavelengths are focused at different distances proximate to the workpiece surface; and
receive reflected light from the workpiece surface and focus at least a portion of the reflected light along the measurement optical path to a point proximate to the fiber aperture;
a reflected light dividing configuration arranged to receive the reflected light from the chromatically dispersive lens configuration, and divide the reflected light as received from the chromatically dispersive lens configuration into a measurement portion and an imaging portion;
a narrowband spectral filter arranged to filter at least part of the imaging portion of the reflected light; and
a camera portion comprising an image detector, configured to receive at least part of the imaging portion of the reflected light passing through the narrowband spectral filter for producing a camera image;
(b) a first light source configured to generate multi-wavelength first light that is input to the optical pen;
(c) a CRS wavelength detector comprising a plurality of pixels with respective pixel positions distributed along a measurement axis of the CRS wavelength detector, configured to receive at least part of the measurement portion of the reflected light and to provide output spectral profile data; and
(d) a processing portion configured to process the output spectral profile data to measure a distance from the optical pen to the workpiece surface, and to make an adjustment so that the distance from the optical pen to the workpiece surface corresponds to a focus distance at which the workpiece surface is in focus when imaged by the light that passes through the narrowband spectral filter, wherein the light that does not pass through the narrowband spectral filter comprises out-of-focus light.

2. The CRS system of claim 1, wherein after the adjustment is made by the processing portion, a corresponding camera image comprises a measurement spot on the in-focus workpiece surface, wherein the measurement spot is formed by part of the imaging portion of the reflected light that comprises first light from the first light source that is output from the fiber aperture and is reflected by the workpiece surface.

3. The CRS system of claim 1, further comprising a second light source that produces second light that is input to the chromatically dispersive lens configuration, wherein the imaging portion comprises reflected second light that is reflected from the workpiece surface.

4. The CRS system of claim 3, wherein the second light source comprises a light emitting diode (LED).

5. The CRS system of claim 3, wherein a spectral bandwidth of the narrowband spectral filter falls within a spectral bandwidth of the second light source.

6. The CRS system of claim 1, wherein the narrowband spectral filter has a spectral bandwidth of less than 10 nanometers.

7. The CRS system of claim 1, wherein the narrowband spectral filter has a spectral bandwidth of less than 5 nanometers.

8. The CRS system of claim 1, wherein a spectral bandwidth of the narrowband spectral filter is similar to a spectral bandwidth of the received reflected light that is coupled through the fiber aperture back into the in/out optical fiber, such that the bandwidth of the narrowband spectral filter is no more than twice the spectral bandwidth coupled back into the fiber.

9. The CRS system of claim 1, wherein the narrowband spectral filter has a center wavelength which corresponds to a middle portion of a CRS measurement range of the CRS system.

10. The CRS system of claim 1, further comprising a screen portion configured to display the camera image.

11. The CRS system of claim 1, wherein the processing portion is operable in a plurality of modes including a measurement mode, in which the distance from the optical pen to the workpiece surface is measured based on the measurement portion of the reflected light, and a guide light mode, in which the camera image of the workpiece surface is produced based on the imaging portion of the reflected light and for which the camera image includes the measurement spot which is configured to be utilized as the guide light.

12. The CRS system of claim 1, wherein the adjustment made by the processing portion comprises causing the distance from the optical pen to the workpiece surface to correspond to the focus distance.

13. The CRS system of claim 12, wherein the adjustment comprises utilizing a motion controller for adjusting the distance from the optical pen to the workpiece surface.

14. The CRS system of claim 13, wherein the motion controller is part of a machine vision inspection system, to which the optical pen is coupled.

15. The CRS system of claim 1, wherein the reflected light dividing configuration comprises a beamsplitter.

16. The CRS system of claim 1, wherein the ratio of the measurement portion to the imaging portion is at least 5 to 1.

17. The CRS system of claim 1, wherein at least part of the measurement portion of the reflected light and at least part of the imaging portion of the reflected light propagate in parallel with each other.

18. The CRS system of claim 1, wherein the measurement portion and the imaging portion of the reflected light extend along two different optical axes after being divided by the reflected light dividing configuration.

19. A method of operating a chromatic range sensor (CRS) system to provide an in-focus image of a workpiece surface to be measured including a measurement spot, the CRS system including:
(a) an optical pen including:
a housing;
an in/out optical fiber including a fiber aperture configured to output light along a measurement optical path and receive reflected light along the measurement optical path;
a chromatically dispersive lens configuration having an optical axis which defines a measurement axis of the chromatic confocal range sensor optical pen, wherein the lens configuration is included in the measurement optical path and is configured to:
receive light and output focused light to a workpiece surface with axial chromatic dispersion such that different wavelengths are focused at different distances proximate to the workpiece surface; and
receive reflected light from the workpiece surface and focus at least a portion of the reflected light along the measurement optical path to a point proximate to the fiber aperture;
a reflected light dividing configuration arranged to receive the reflected light from the chromatically dispersive lens configuration, and divide the reflected light as received from the chromatically dispersive lens configuration into a measurement portion and an imaging portion;
a narrowband spectral filter arranged to filter at least part of the imaging portion of the reflected light; and
a camera portion comprising an image detector, configured to receive at least part of the imaging portion of the reflected light passing through the narrowband spectral filter for producing a camera image;
(b) a first light source configured to generate multi-wavelength first light that is input to the optical pen; and
(c) a CRS wavelength detector comprising a plurality of pixels with respective pixel positions distributed along a measurement axis of the CRS wavelength detector, configured to receive at least part of the measurement portion of the reflected light and to provide output spectral profile data;
the method comprising:
operating the CRS system to measure a distance from the optical pen to the workpiece surface based on the output spectral profile data;
making an adjustment so that the distance from the optical pen to the workpiece surface corresponds to a focus distance at which the workpiece surface is in focus when imaged by the light that passes through the narrowband spectral filter; and
displaying a camera image of the workpiece surface including a measurement spot.

20. The method of claim 19, further comprising:
illuminating the workpiece surface with second light that is input to the chromatically dispersive lens configuration, wherein the second light comprises wavelengths that fall within the spectral bandwidth of the narrowband spectral filter and the imaging portion comprises reflected second light that is utilized for imaging the workpiece surface.

21. The method of claim 20, wherein the imaging portion further comprises reflected first light for imaging a measurement spot, for which the camera image includes an image of the workpiece surface and an image of the measurement spot on the workpiece surface.

22. The method of claim 19, wherein the narrowband spectral filter has a center wavelength corresponding to a middle portion of a CRS measurement range of the CRS system.

23. The method of claim 19, further comprising:
coupling the CRS system to a machine vision inspection system that includes a motion mechanism; and
operating the CRS system as part of the machine vision inspection system, wherein the adjustment that is made comprises utilizing the motion mechanism of the machine vision system to cause the distance from the optical pen to the workpiece surface to correspond to the focus distance at which the workpiece surface is in focus when imaged by the light that passes through the narrowband spectral filter.

24. A chromatic range sensor (CRS) system operable to provide an in-focus image of a workpiece surface to be measured, the image including a measurement spot formed on the workpiece surface, the CRS system comprising:
  (a) an optical pen including:
    a housing;
    an in/out optical fiber including a fiber aperture configured to output light along a measurement optical path and receive reflected light along the measurement optical path;
    a chromatically dispersive lens configuration having an optical axis which defines a measurement axis of the chromatic confocal range sensor optical pen, wherein the lens configuration is included in the measurement optical path and is configured to:
      receive light and output focused light to a workpiece surface with axial chromatic dispersion such that different wavelengths are focused at different distances proximate to the workpiece surface; and
      receive reflected light from the workpiece surface and focus at least a portion of the reflected light along the measurement optical path to a point proximate to the fiber aperture;
    a reflected light dividing configuration arranged to receive the reflected light from the chromatically dispersive lens configuration, and divide the reflected light as received from the chromatically dispersive lens configuration into a measurement portion and an imaging portion;
    a narrowband spectral filter arranged to filter at least part of the imaging portion of the reflected light; and
    a camera portion comprising an image detector, configured to receive at least part of the imaging portion of the reflected light passing through the narrowband spectral filter for producing a camera image;
  (b) a first light source configured to generate multi-wavelength first light that is input to the optical pen;
  (c) a CRS wavelength detector comprising a plurality of pixels with respective pixel positions distributed along a measurement axis of the CRS wavelength detector, configured to receive at least part of the measurement portion of the reflected light and to provide output spectral profile data;
  (d) one or more processors; and
  (e) a memory coupled to the one or more processors and storing program instructions that when executed by the one or more processors cause the one or more processors to at least:
    operate the CRS system to measure a distance from the optical pen to the workpiece surface based on the output spectral profile data;
    make an adjustment so that the distance from the optical pen to the workpiece surface corresponds to a focus distance at which the workpiece surface is in focus when imaged by the light that passes through the narrowband spectral filter; and
    display a camera image of the workpiece surface including a measurement spot.

* * * * *